United States Patent
Crombez et al.

(10) Patent No.: US 9,494,093 B2
(45) Date of Patent: Nov. 15, 2016

(54) DETECTING AND NEGOTIATING A CLIMBABLE OBSTACLE IN A VEHICLE

(71) Applicant: Ford Global Technologies, LLC, Dearborn, MI (US)

(72) Inventors: Dale Scott Crombez, Livonia, MI (US); David Crist Gabriel, Royal Oak, MI (US); Jonathan Andrew Butcher, Farmington, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 177 days.

(21) Appl. No.: 14/509,418

(22) Filed: Oct. 8, 2014

(65) Prior Publication Data

US 2016/0102622 A1    Apr. 14, 2016

(51) Int. Cl.
| F02D 41/14 | (2006.01) |
| F02D 41/02 | (2006.01) |
| G01L 5/22  | (2006.01) |
| F02D 41/26 | (2006.01) |

(52) U.S. Cl.
CPC ....... F02D 41/0215 (2013.01); F02D 41/1497 (2013.01); G01L 5/22 (2013.01); F02D 41/26 (2013.01); F02D 2200/021 (2013.01); F02D 2200/701 (2013.01); F02D 2200/702 (2013.01); F02D 2250/26 (2013.01)

(58) Field of Classification Search
None
See application file for complete search history.

(56) References Cited

U.S. PATENT DOCUMENTS

| 6,182,000 B1* | 1/2001 | Ohta ................ B60K 31/0058 180/170 |
| 6,434,472 B1* | 8/2002 | Minowa ............ B60K 31/0008 477/115 |
| 6,793,034 B2 | 9/2004 | Raftari et al. |
| 8,099,213 B2 | 1/2012 | Zhang et al. |
| 2001/0014845 A1* | 8/2001 | Minowa ................ A61B 3/032 701/84 |
| 2010/0030473 A1 | 2/2010 | Au et al. |
| 2010/0250056 A1* | 9/2010 | Perkins .................. B60T 8/172 701/33.4 |
| 2012/0197497 A1* | 8/2012 | Kato ..................... B60W 30/18 701/48 |
| 2013/0321627 A1 | 12/2013 | Turn, Jr. et al. |
| 2014/0063232 A1 | 3/2014 | Fairfield et al. |

OTHER PUBLICATIONS

Byun et al., "ESTRO: Design and Development of Intelligent Autonomous Vehicle for Shuttle Service in the ETRI", supported by the ETRI Research and Development Support Program of MKE/KEIT, Aug. 20, 2012, 6 pages.

* cited by examiner

*Primary Examiner* — Justin Holmes
(74) *Attorney, Agent, or Firm* — Frank A. MacKenzie; Bejin Bieneman PLC

(57) ABSTRACT

Data is collected in a vehicle relating to a potential obstacle. Based at least in part on the collected data, an obstacle is identified. At least one characteristic of the obstacle is determined. At least one torque to be applied in a vehicle powertrain is determined based at least in part on the at least one characteristic of the obstacle.

20 Claims, 2 Drawing Sheets

DETECTING AND NEGOTIATING A CLIMBABLE OBSTACLE IN A VEHICLE

BACKGROUND

Torque management in a vehicle powertrain can be problematic in certain situations, including where a vehicle is attempting to climb an obstacle, such as a curb. For example, electric-powered powertrains are susceptible to an electric component, e.g., a motor, overheating if power, i.e., torque, is applied for an extended period of time while the component is not moving (i.e., it is stalled on one set of windings). In such a situation, e.g., where attempting to climb a curb, a vehicle operator may attempt to slowly climb over the curb so that the vehicle does not over-accelerate when the curb is cleared. However, a result of slowly applying torque may be to cause the vehicle to be in a motor stall situation long enough to activate a thermal protection strategy wherein power is cut, thus preventing the vehicle from climbing an obstacle such as a curb.

DRAWINGS

DESCRIPTION

Introduction

Figure 1:
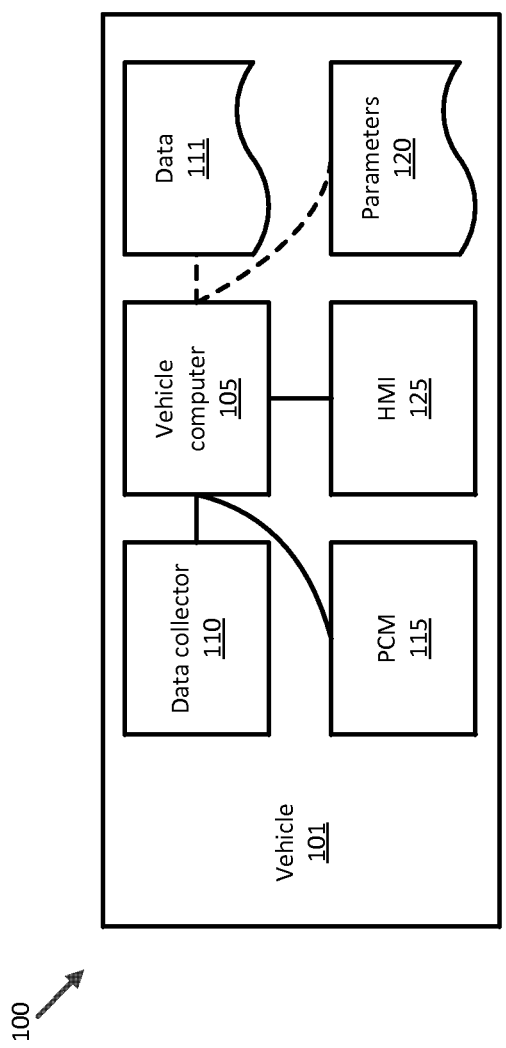
FIG. 1 is a block diagram of an exemplary system for managing torque applied to a vehicle powertrain.

FIG. 1 is a block diagram of an exemplary a system 100 in a vehicle 101 for managing torque to a powertrain. The system 100 includes a vehicle computer 105 programmed to receive data 111 from one or more vehicle data collectors 110, e.g., sensors, and to use the data 111 along with one or more stored parameters 120, to provide instructions concerning appropriate torque to a powertrain control module (PCM) 115. The data 111 may indicate that the vehicle 101 is about to encounter, or is encountering, a climbable obstacle such as a curb. The parameters 120 govern various aspects of how torque is to be managed depending on various values included in the data 111 relating to the climbable obstacle. Accordingly, the present disclosure includes power and/or torque management strategies to manage torque applied to a powertrain when a vehicle 101 is climbing an obstacle. A purpose of such strategies is to ensure, or at least minimize the possibility, that torque is provided at a level that will not overheat an electric component that supplies power to the powertrain. The system 100 is described herein with respect to protecting an electric motor component, but it is to be understood that other kinds of components, e.g., clutches or other components that may be susceptible to over-heating.

Exemplary System Elements

A vehicle 101 includes a vehicle computer 105 that generally includes a processor and a memory, the memory including one or more forms of computer-readable media, and storing instructions executable by the processor for performing various operations, including as disclosed herein. For example, the computer 105 generally includes, and is capable of executing, instructions for managing torque applied to a vehicle 101 powertrain as described herein.

Further, the computer 105 may include more than one computing device, e.g., controllers or the like included in the vehicle 101 for monitoring and/or controlling various vehicle components, e.g., an engine control unit (ECU), transmission control unit (TCU), etc. The powertrain control module (PCM) 115 thus may be included in the computer 105 or may be a separate computing device communicatively coupled to the computer 105.

The computer 105 is generally configured for communications on a controller area network (CAN) bus or the like. The computer 105 may also have a connection to an onboard diagnostics connector (OBD-II). Via the CAN bus, OBD-II, and/or other wired or wireless mechanisms, the computer 105 may transmit messages to various devices in a vehicle 101, e.g., controllers, actuators, sensors, etc., and/or receive messages including data 111 from such devices. Alternatively or additionally, in cases where the computer 105 actually comprises multiple devices, the CAN bus or the like may be used for communications between devices represented as the computer 105 in this disclosure.

Possibly included in instructions stored in and executed by the computer 105 are instructions for autonomous or semi-autonomous operation of the vehicle 101. That is, using data received in the computer 105, e.g., from data collectors 110, the computer 105 may control various vehicle 101 components and/or operations to operate the vehicle completely, or at least partially, without operator input. For example, the computer 105 may include instructions to regulate one or more of vehicle 101 speed, acceleration, deceleration, steering, distance between vehicles and/or amount of time between vehicle, etc. Further, as disclosed herein, the computer 105 generally includes instructions to regulate torque applied in a vehicle 101 powertrain.

Data collectors 110 may include a variety of devices. For example, various controllers in a vehicle may operate as data collectors 110 to provide collected data 111 via the CAN bus, e.g., collected data 111 relating to vehicle speed, acceleration, etc. Further, sensors or the like, global positioning system (GPS) equipment, etc., could be included in a vehicle and configured as data collectors 110 to provide data directly to the computer 105, e.g., via a wired or wireless connection. Data collectors 110 could also include sensors or the like, e.g., medium-range and long-range sensors. For example, sensor data collectors 110 could include mechanisms such as temperature sensors, ultrasonic sensors, speed sensors, radios, RADAR, lidar, sonar, cameras or other image capture devices, etc., that could be deployed to obtain collected data 111 relevant to operation of the vehicle 101, e.g., measure a distance between the vehicle 101 and other vehicles or objects, to detect other vehicles or objects, and/or to detect road conditions, such as curbs, curves, potholes, dips, bumps, changes in grade, etc.

A memory of the computer 105 generally stores collected data 111. Collected data 111 may include a variety of data collected in a vehicle 101 from data collectors 110. In general, collected data 111 may include any data that may be gathered by a collection device 110 and/or computed from such data. Accordingly, collected data 111 could include a variety of data 111 related to vehicle 101 operations and/or performance, such as data indicating that the vehicle 101 is near, about to climb, and/or climbing an obstacle such as a curb. More generally, collected data 111 could include data concerning a vehicle 101 speed, acceleration, braking, average distances from other vehicles at respective speeds or ranges of speeds, and/or other data 111 relating to vehicle 101 operation.

As mentioned above, the computer 105, in addition to collected data 111, may use one or more parameters 120 to determine a torque instruction to the PCM 115. Parameters 120 may include one or more of the following:

- A ground clearance of the vehicle 101, e.g., measured in centimeters, indicating a distance between the ground and in underside of the vehicle 101 that can be accommodated without the underside of the vehicle 101 contacting the ground; and/or
- One or more torque values associated with one or more time values, thereby indicating respective periods of time for which respective torques may be applied to a vehicle 101 powertrain without causing a danger of overheating an electric component, e.g., motor, of the vehicle 101.

The vehicle 101 may include a human machine interface (HMI) 125 as part of, or communicatively coupled to, the computer 105. For example, an HMI 125 may include a display screen, an input device, speakers, microphones, etc., to allow a vehicle 101 occupant to receive output from, and provide input to, the computer 105. Further, operations of the HMI 125 may be embodied in a user device such as a smart phone or the like communicatively coupled to the computer 105, e.g., using a wireless protocol such as Bluetooth.

Exemplary Process Flow

Figure 2:
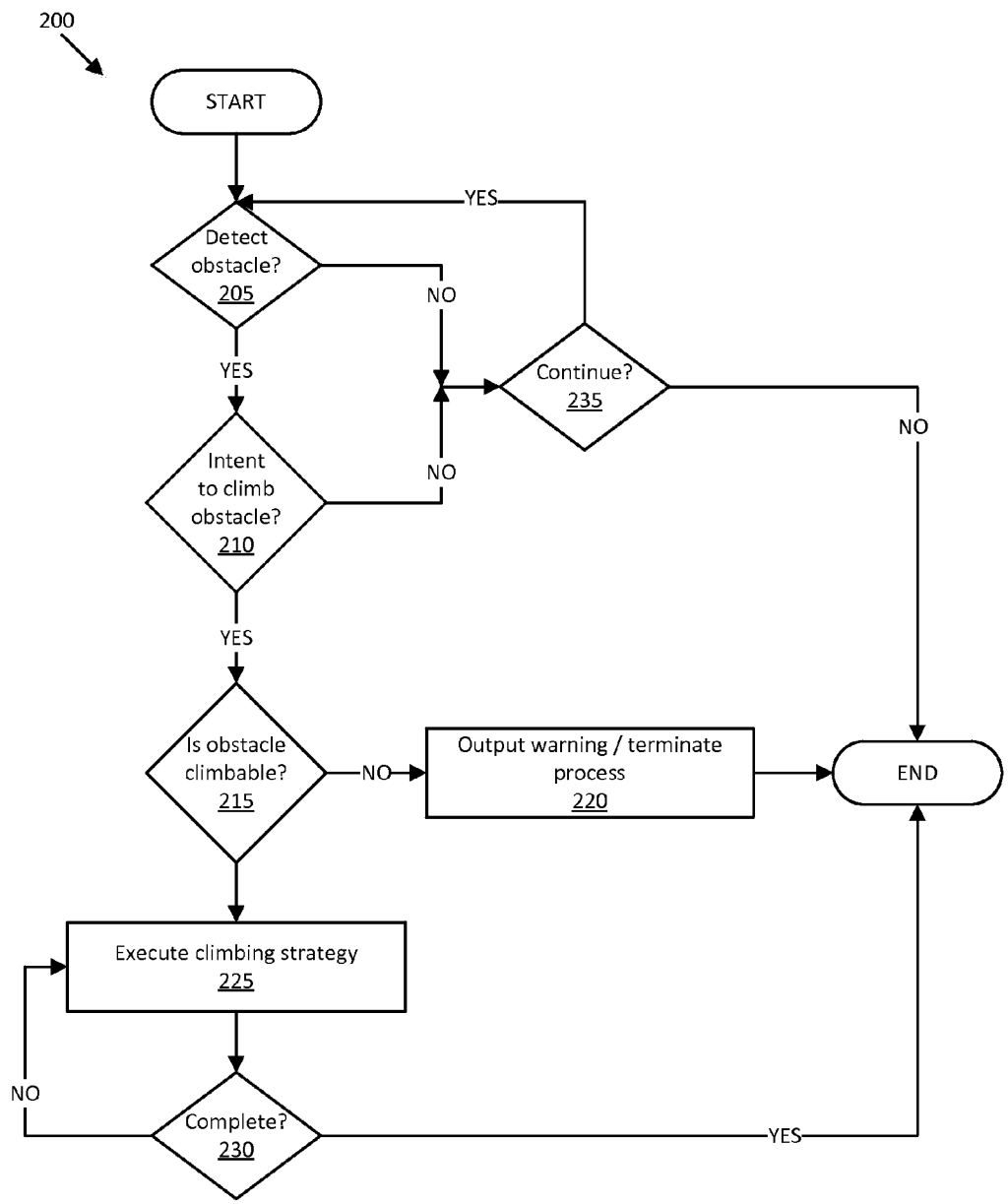
FIG. 2 is diagram of an exemplary process for managing torque applied to a vehicle powertrain.

FIG. 2 is diagram of an exemplary process 200 for managing torque applied to a vehicle 101 powertrain. The process 200 begins in a block 205, in which the vehicle 101 computer 105 determines whether a climbable obstacle is detected and identified, i.e., whether the vehicle 101 is approaching, about to climb, and/or is climbing an obstacle such as a curb. Techniques are generally known for detecting and identifying such obstacles, e.g., curbs, using sensor data collectors 110, e.g., radar, lasers, image sensors, and/or other sensors, to provide data 111 indicating that a vehicle 101. Such data 111 may further provide characteristics of the obstacle, such as a grade or grades associated with an incline or inclines on the obstacle, a height of the obstacle, a surface attribute of the obstacle (wet, dry, rough, smooth, etc.) etc. Alternatively or additionally, a climbable obstacle could be detected via other mechanisms, e.g., data 111 from a PCM 115 and/or other vehicle 101 components could detect that an amount of torque being applied to the powertrain relative to vehicle 101 speed determines that the vehicle 101 is attempting to negotiate a climbable obstacle. If a climbable obstacle is detected, then the process 200 proceeds to a block 210. Otherwise, the process 200 proceeds to a block 235.

In the block 210, which may follow the block 205, the computer 105 determines whether the vehicle 101 is likely about to climb, or is attempting to climb, the obstacle. For example, regardless of whether the vehicle 101 is autonomously or manually operated, data 111 including vehicle 101 speed, steering angle, distance from the obstacle such as a curb, etc., can be used to determine whether the vehicle is about to climb or attempting to climb the obstacle. If the determination of the block 210 is no, then the process 200 proceeds to the block 235. If the determination of the block 210 is yes, then the process 200 proceeds to the block 215.

In the block 215, which may follow the block 210, the computer 105 determines whether the detected obstacle is climbable by the vehicle 101. The block 215 may be omitted, but is desirable to minimize the risk of damage to the vehicle 101, e.g., to the vehicle 101 body, frame, etc. For example, a ground clearance parameter 120 may be compared to data 111 indicating a detected height of the obstacle. If the ground clearance of the vehicle 101 is not sufficiently greater than the height of the obstacle, the computer 105 determines that the obstacle is not climbable. In this context, "sufficiently greater" can mean that the ground clearance of the vehicle 101 is greater than the height of the obstacle by a predetermined safety margin, e.g., one centimeter, five centimeters, etc. In any case, if the determination of the block 215 is negative, then the process 200 proceeds to a block 220. If the determination of the block 215 is yes, then the process 200 proceeds to a block 225.

In the block 220, which may follow the block 215, the computer 105 provides a warning via the HMI 125 to a vehicle 101 driver that the obstacle is not climbable. Such warning could be provided via one or more known mechanisms included in the HMI 125 such as a display screen, audio output, haptic output, etc. Further, the computer 105 may terminate and/or prevent the process of attempting to climb the obstacle. For example, the computer 105 could provide an instruction preventing a steering angle that would direct the vehicle 101 toward the obstacle. Moreover, the computer 105 could prevent the PCM 115 from receiving an instruction to apply torque to the powertrain if the vehicle 101 is directed toward the obstacle, i.e., effectively stalling application of torque to the powertrain if the vehicle 101 attempts to climb the obstacle. Following the block 220, the process 200 ends.

In the block 225, which may follow the block 215, the computer 105 determines and causes the vehicle 101 to execute a strategy for climbing the obstacle. The strategy generally includes determining a torque to be applied to a vehicle 101 powertrain at one or more times and/or for one or more periods of time. For example, the computer 105 may use parameters 120 indicating a maximum torque that may be applied to a powertrain in the vehicle 101 for a period of time without causing an electric component in the vehicle 101 to overheat. The computer 105 may also calculate a torque value or values that may change over time sufficient to cause the vehicle 101 to climb the obstacle. The computer 105 may then provide an appropriate torque instruction to the PCM 115, i.e., directing the PCM 115 to apply torque sufficient to cause the vehicle 101 to climb the obstacle without applying torque that will cause an electric component in the vehicle 101 to overheat. In general, it will be understood that sufficient torque for climbing an obstacle, i.e., an amount of torque to the powertrain that will allow the vehicle 101 to climb the obstacle can be determined by considering one or more of obstacle, e.g., curb, height, obstacle, e.g., curb, shape and/or grade, radius of vehicle 101 tire, mass of vehicle 101, presence or absence of four-wheel or all-wheel wheel drive, road surface conditions (e.g., dry, wet, icy, snowy, etc.), etc.

Applying a torque or torques to a powertrain to allow a vehicle 101 to climb and obstacle without overheating an electric meter component may include a variety of strategies. One such possible strategy is that, irrespective of a driver instruction, e.g., an accelerator pedal position, the computer 105 may delay application of torque needed to climb and obstacle to a powertrain until an incline of the obstacle is actually encountered. That is, a vehicle operator may accelerate or "gun" toward an obstacle such as a curb before the obstacle is reached; the computer 105 may be programmed to ignore an operator's instruction for such acceleration, causing the vehicle 101 to approach the obstacle at a speed that is unlikely to cause damage to the vehicle 101, and that is unlikely to cause the vehicle 101 to "jump" or overshoot the obstacle, i.e., continue past the obstacle, e.g., onto a sidewalk proximate to a curb, at an unsafe speed.

Additionally or alternatively, the computer 105 could be programmed to modify torque requested by a driver. For example, driver-requested torque, e.g., as indicated by an accelerator pedal position, could be determined by the computer 105 to be likely to cause the vehicle 101 to travel up an incline presented by the obstacle at a greater than safe speed, to cause an electric component to overheat, and/or to pose some other danger. Parameters 120 could govern a safe speed at which an obstacle such as a curb could be climbed, torque values that may be applied without causing a danger of overheating, etc., as mentioned above. For example, if a driver requests a sudden increase in torque while climbing and obstacle, such sudden increase may be likely to cause component overheating. Accordingly, the computer 105 could be programmed to increase torque over time to a torque level requested by the driver and/or sufficient to climb the obstacle, rather than immediately increasing to a requested torque level.

Further, the computer 105 could be programmed to modify torque values on a non-linear basis. For example, if torque should be increased to allow a vehicle 101 to climb and obstacle, increasing the torque at a constant rate for a period of time to achieve the sufficient torque may pose a risk of overheating an electric component that could be avoided by increasing the torque at different rates for a period of time until the sufficient torque is achieved. For example, torque may be increased more slowly for a first period of time, the rate of increase being increased for a second period of time until the sufficient torque is achieved. In another example, the computer 105 could be programmed to provide a "burst" or "pulse" of torque, i.e., an initial relatively high application of torque, to a powertrain to generate momentum to allow a vehicle 101 to begin climbing an obstacle such as a curb. Then, the computer 105 could instruct the PCM 115 to reduce torque to values sufficient to allow the vehicle 101 to continue climbing the obstacle. In general, the driver-requested torque could be modified, i.e., increased or reduced, to cause the vehicle 101 to climb the obstacle.

Continuing now with the process 200, in a block 230, the computer 105 determines whether the vehicle 101 has completed climbing the obstacle, e.g., whether a vehicle 101 tire has climbed the obstacle, e.g., a curb. If the obstacle has been completely climbed, then the process 200 ends. However, before the process 200 ends, the computer 105 may make further adjustments to torque being applied in the vehicle 101 powertrain. For example, a driver-requested torque, e.g., as indicated by an accelerator pedal position, may be intended to cause the vehicle 101 to climb of the obstacle even after climbing the obstacle is completed, whereupon the computer 105 may reduce the torque appropriately.

Further, if the vehicle 101 has not completed climbing the obstacle, then the process 200 returns to the block 225. Upon return to the block 225, the computer 105 may make further adjustments to torque being applied to the vehicle 101 powertrain. For example, as an incline of the obstacle changes, as time elapses such that a present torque is likely to cause electric component overheating, etc., the computer 105 may adjust a torque provided to the PCM 115 to be suitable to a changed condition, e.g., change in incline, possible overheating situation, etc.

CONCLUSION

Computing devices such as those discussed herein generally each include instructions executable by one or more computing devices such as those identified above, and for carrying out blocks or steps of processes described above. For example, process blocks discussed above are embodied as computer-executable instructions.

Computer-executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in a computing device is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

In the drawings, the same reference numbers indicate the same elements. Further, some or all of these elements could be changed. With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given ordinary meanings as understood by those skilled in the art unless an explicit indication to the contrary in made herein. In particular, use of the singular articles such as "a," "the,"

"said," etc. should be read to recite one or more of the indicated elements unless a claim recites an explicit limitation to the contrary.

The invention claimed is:

1. A system comprising a computing device having a processor and a memory, the memory storing instructions executable by the processor such that the computing device is programmed to:
   collect data in a vehicle relating to a potential obstacle;
   based at least in part on the collected data, identify an obstacle and determine at least one characteristic of the obstacle;
   determine at least one torque to be applied in a vehicle powertrain based at least in part on the at least one characteristic of the obstacle; and
   cause the determined torque to be applied in the vehicle powertrain.

2. The system of claim 1, wherein the computing device is further programmed to determine the torque based at least in part on a parameter related to overheating of a component in the vehicle.

3. The system of claim 1, wherein the computing device is further programmed to determine the at least one torque by at least one of delaying a torque requested according to a driver input and modifying a torque requested according to a driver input.

4. The system of claim 1, wherein the at least one torque includes a first torque and a second torque, and further wherein the computer is further programmed to determine the second torque according to a non-linear relationship with the first torque.

5. The system of claim 1, wherein the at least one torque is sufficient to allow the vehicle to climb the obstacle.

6. The system of claim 1, wherein the computer is further programmed to reduce the at least one torque upon determining that the vehicle has completed climbing the obstacle.

7. The system of claim 1, wherein the collected data includes data received from at least one sensor, further wherein the at least one sensor includes at least one of radar, an ultrasonic sensor, an image sensor, and a laser.

8. The system of claim 1, wherein the at least one characteristic of the obstacle includes at least one of a height, a grade, and a surface condition.

9. The system of claim 1, wherein the at least one characteristic of the obstacle includes whether obstacle is climbable; and further wherein the computer is further programmed to determine the at least one torque based at least in part on the obstacle being unclimbable by the vehicle.

10. The system of claim 2, wherein the component is an electric motor.

11. A method, comprising:
    collecting data in a vehicle relating to a potential obstacle;
    based at least in part on the collected data, identifying an obstacle and determining at least one characteristic of the obstacle;
    determining at least one torque to be applied in a vehicle powertrain based at least in part on the at least one characteristic of the obstacle; and
    cause the determined torque to be applied in the vehicle powertrain.

12. The method of claim 11, further comprising determining the torque based at least in part on a parameter related to overheating of a component in the vehicle.

13. The method of claim 11, further comprising determining the at least one torque by at least one of delaying a torque requested according to a driver input and modifying a torque requested according to a driver input.

14. The method of claim 11, wherein the at least one torque includes a first torque and a second torque, the method further comprising determining the second torque according to a non-linear relationship with the first torque.

15. The method of claim 11, wherein the at least one torque is sufficient to allow the vehicle to climb the obstacle.

16. The method of claim 11, further comprising reducing the at least one torque upon determining that the vehicle has completed climbing the obstacle.

17. The method of claim 11, wherein the collected data includes data received from at least one sensor, further wherein the at least one sensor includes at least one of radar, an ultrasonic sensor, an image sensor, and a laser.

18. The method of claim 11, wherein the at least one characteristic of the obstacle includes at least one of a height, a grade, and a surface condition.

19. The method of claim 11, wherein the at least one characteristic of the obstacle includes whether obstacle is climbable; the method further comprising determining the at least one torque based at least in part on the obstacle being unclimbable by the vehicle.

20. The method of claim 12, wherein the component is an electric motor.

* * * * *